US005115373A

United States Patent [19]

Takeda

[11] Patent Number: 5,115,373

[45] Date of Patent: May 19, 1992

[54] DIELECTRIC FILTER

[75] Inventor: Yukihiro Takeda, Kashihara, Japan

[73] Assignee: Matsushita Electric Industrial Co., Ltd., Osaka, Japan

[21] Appl. No.: 728,630

[22] Filed: Jul. 11, 1991

[51] Int. Cl.[5] ........................ H01G 1/14; H01P 1/205

[52] U.S. Cl. ...................................... 361/329; 333/202

[58] Field of Search ................ 333/202, 206; 361/228, 361/229, 330; 29/25.42

[56] References Cited

U.S. PATENT DOCUMENTS 3,426,257 2/1969 Youngquist .................... 29/25.42 X 4,839,773 6/1989 Ishikawa et al. .................... 361/321

5,055,808 10/1991 Walker ............................ 333/202 X

*Primary Examiner*—Donald A. Griffin

*Attorney, Agent, or Firm*—Ratner & Prestia

[57] ABSTRACT

A dielectric filter comprising: a substrate; a plurality of dielectric coaxial resonators arranged in a row on the substrate; and an inductance element interposed between the dielectric coaxial resonators on the substrate. The plurality of dielectric coaxial resonators are electrically connected in parallel through a capacitance, and relative to said capacitance the inductance element is electrically connected in parallel. The filter has a low overall height and exhibits a good and reliable filter characteristic.

1 Claim, 2 Drawing Sheets

DIELECTRIC FILTER

BACKGROUND OF THE INVENTION

1. Field of the Invention

The present invention relates to a dielectric filter used in an automobile telephone and the like.

2. Description of the Related Art

Hitherto, a conventional dielectric filter typically has a construction shown in FIG. 2.

In FIG. 2 the numeral 1 represents dielectric coaxial resonators of λ/4 type which are arranged in a row on a substrate 2. FIG. 3 shows an electric circuit diagram which corresponds to the filter of FIG. 2.

These dielectric coaxial resonators 1 are electrically connected in parallel through a capacitance (represented by the numeral 3 in FIG. 3) formed on a substrate 2. Because of this arrangement, the filter has for example a sending band illustrated by hatching in FIG. 4.

The symbol A in FIG. 4 is a pole to ensure an increased amount of attenuation at a high-frequency region. This attenuation is necessary to clearly separate the sending band from a receiving band at the high frequency region.

The pole A is formed by an inductance 4 which is electrically connected in parallel to the capacitance 3 as illustrated in FIG. 3. The inductance 4 is constituted by a pattern formed on the substrate 5 shown in FIG. 2.

In FIG. 3, the numerals 6 and 7 are respectively an input terminal and an output terminal.

However, a conventional filter in which a pole A is obtained by an inductance 4 formed on a substrate 5 has a drawback in that, as readily understandable from FIG. 2, the overall height of the filter is increased by the additional height due to the substrate 5.

In view of the recent circumstances in which an automobile telephone has become more and more compact, the above-mentioned drawback of increased overall height is really an important problem.

SUMMARY OF THE INVENTION

An object of the invention is to provide a dielectric filter having a low overall height.

The object is attained by the present invention which provides a dielectric filter comprising:

a substrate;

a plurality of dielectric coaxial resonators arranged in a row on the substrate; and an inductance element interposed between the dielectric coaxial resonators on the substrate;

wherein the plurality of dielectric coaxial resonators are electrically connected in parallel through a capacitance, and relative to the capacitance the inductance element is electrically connected in parallel.

The above structure eliminates the need of the extra substrate used in the prior art, and therefore the overall height of the filter in accordance with the present invention is lower than the prior art filter by the height of the eliminated extra substrate.

DESCRIPTION OF THE DRAWINGS

Embodiments of the invention will now be described by way of example only, in conjunction with the attached drawings in which:

FIG. 1 (*b*) is a side view showing an inductance element of the embodiment shown in FIG. 1 (*a*);

DETAILED DESCRIPTION OF THE INVENTION

Figure 1A:
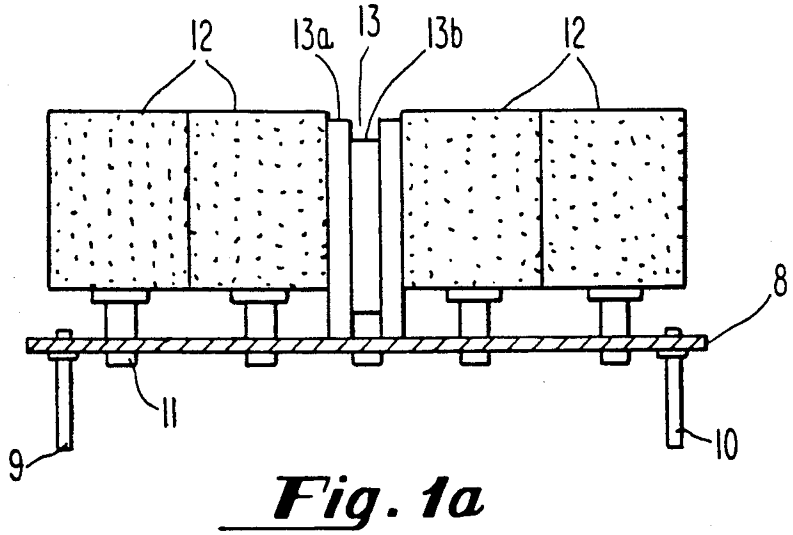
FIG. 1 (*a*) is a front view showing an embodiment of a filter in accordance with the present invention.
Figure 1B:
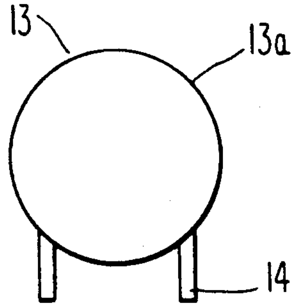
Figure 2:
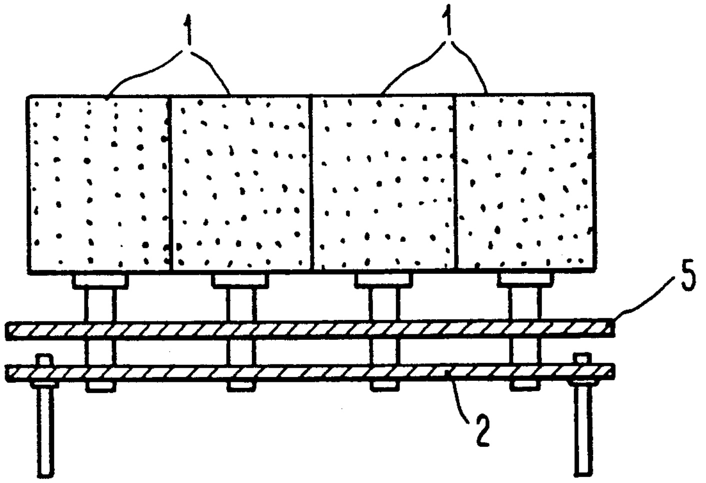
PRIOR ART Fig. 2
FIG. 2 is a front view showing a prior art filter.

In FIG. 1 (*a*), substrate 8 has an electrically conductive pattern appropriately formed on either side surface. Near both ends of the substrate, an input terminal 9 and an output terminal 10 are connected by soldering.

Four pins 11 stand on the upper surface of substrate 8, and another end of each pin 11 is inserted into a center hole of a square-pillar-shaped dielectric coaxial resonator 12 and fixed by soldering with the installed condition being maintained.

Figure 3:
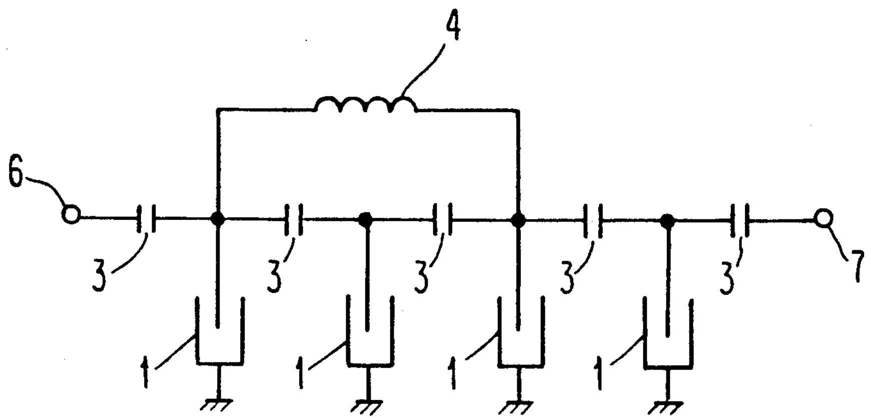
FIG. 3 is an electric circuit diagram of a dielectric filter.

The dielectric coaxial resonator 12 has an external shape like a short square pillar. Adjoining walls of the adjacent resonators 12 on either side are put together by soldering. Further, these walls are grounded. Up to this step, these dielectric coaxial resonators 12 are, similar to the conventional arrangement in FIG. 3, electrically connected in parallel through a capacitance or capacitances formed on the substrate 8.

Figure 4:
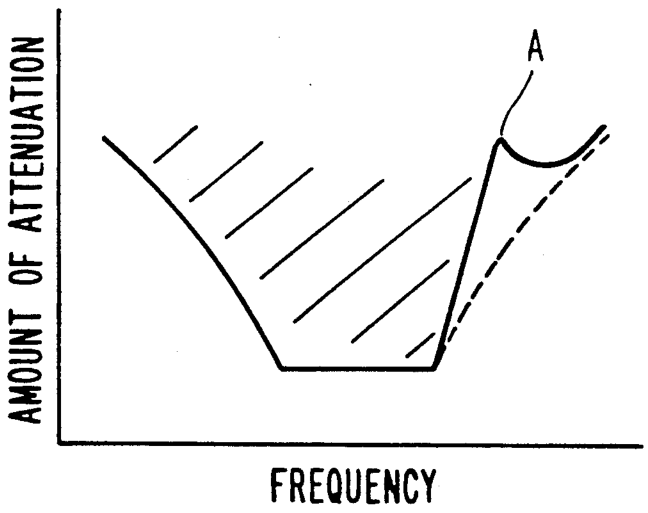
FIG. 4 is a graph showing a frequency-attenuation characteristic of a dielectric filter.

The numeral 13 in FIG. 1 (*a*) is an inductance element, which is also illustrated in FIG. 1 (*b*). The inductance element 13 is, as shown in the drawings, formed in such a manner that a peripheral groove 13*b* of a drum 13*a* made of a synthetic resin is fitted with a coil 14. The coil 14 is connected to a conductive pattern formed on the substrate 8. This provides a circuit similar to FIG. 3 wherein the inductance element 13 is electrically connected in parallel relative to the capacitance or capacitances, and consequently exhibits a filter characteristic similar to FIG. 4.

It should be further noted that the drum 13*a* is arranged as shown in FIG. 1 (*a*) so that the upper end of the drum 13*a* is lower than that of the dielectric coaxial resonator 12.

Thus, the dielectric filter of the present invention has an inductance element interposed between dielectric coaxial resonators. This enables the filter to have a lower overall height than a conventional filter.

The filter of the present invention is also different from a filter having an inductance element arranged outside adjacent to a dielectric coaxial resonator. The latter has a drawback that the inductance value changes as a result of being influenced by parts or the like located next to the inductance element. In contrast with the latter, the filter of the present invention has an inductance element interposed between dielectric coaxial resonators, and therefore the inductance element is protected by grounded adjoining walls of the dielectric coaxial resonators. This arrangement prevents a change in the inductance value occurring due to a condition at the location of the inductance element, and limits the change in the inductance value within a very small degree. As a result, the dielectric filter of the present invention exhibits a good and reliable filter characteristic.

What is claimed is:

1. A dielectric filter comprising:

a substrate;

a plurality of dielectric coaxial resonators arranged in a row on said substrate; and an inductance element interposed between two of said plurality of dielectric coaxial resonators;

wherein said plurality of dielectric coaxial resonators are electrically connected in parallel through a capacitance, and said inductance element is electrically connected in parallel relative to said capacitance.

* * * * *